Aug. 19, 1924.
C. K. BULGARIDES
1,505,859
ARMOR OR PROTECTOR FOR PNEUMATIC TIRES
Filed Dec. 6, 1923     2 Sheets-Sheet 1
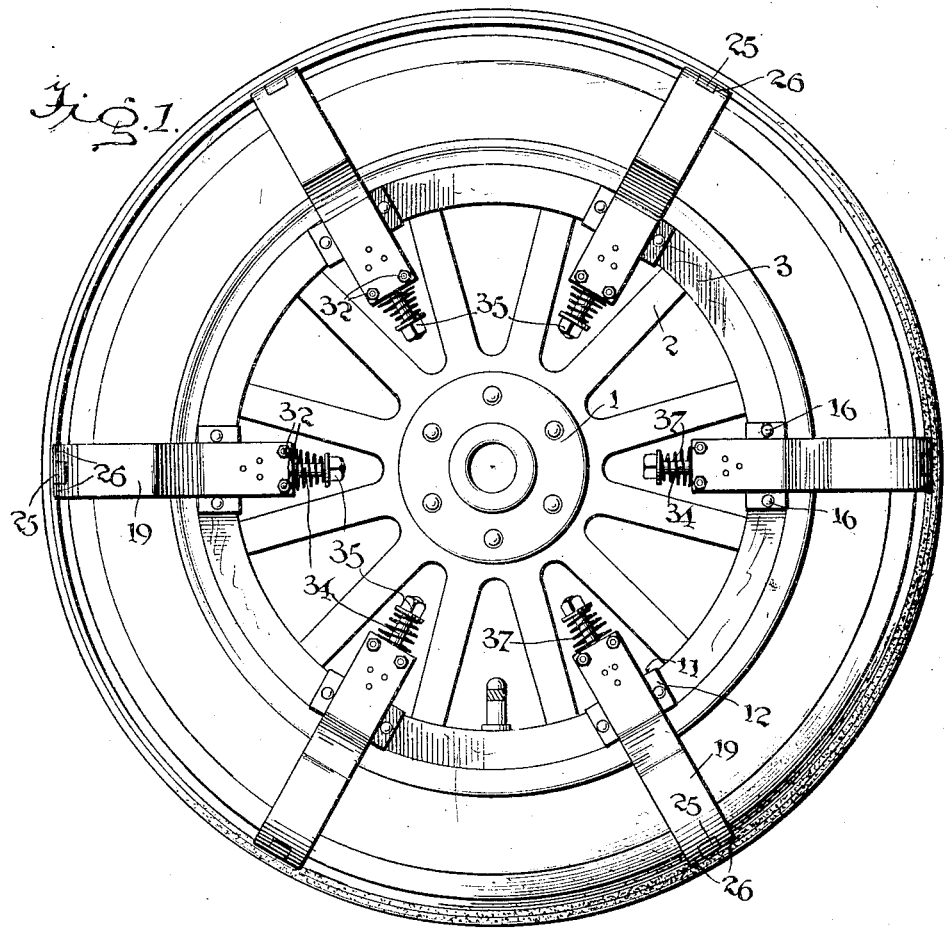
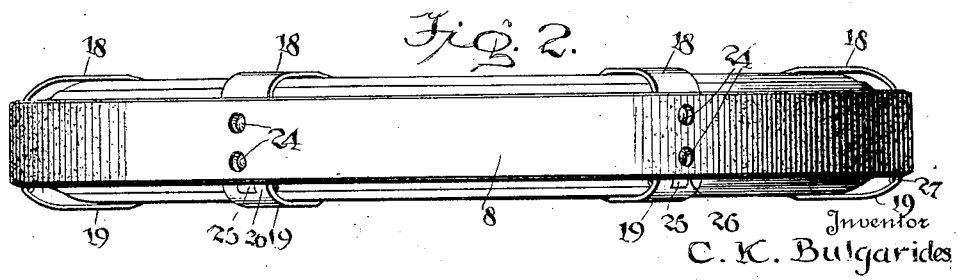
Inventor
C. K. Bulgarides
By Geo. P. Kimmel
Attorney

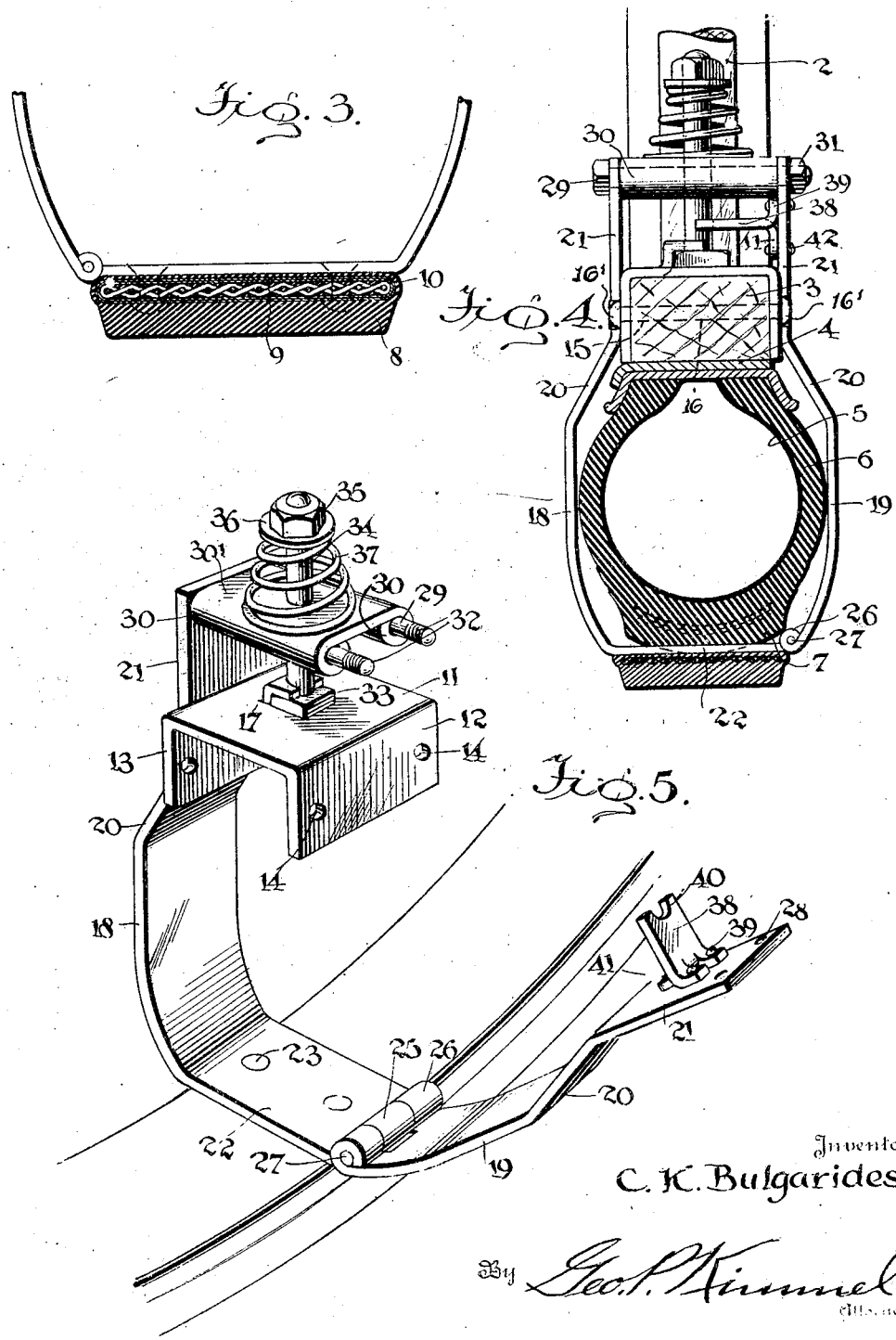

Patented Aug. 19, 1924.

1,505,859

UNITED STATES PATENT OFFICE.

CHARLES K. BULGARIDES, OF TACOMA, WASHINGTON.

ARMOR OR PROTECTOR FOR PNEUMATIC TIRES.

Application filed December 6, 1923. Serial No. 678,940.

*To all whom it may concern:*

Be it known that I, CHARLES K. BULGARIDES, a citizen of the United States, residing at Tacoma, in the county of Pierce and State of Washington, have invented certain new and useful Improvements in Armors or Protectors for Pneumatic Tires, of which the following is a specification.

This invention relates to an armor or protector for pneumatic tires of the removable type, and has for its object to provide a device of such class, in a manner as hereinafter set forth, for not only increasing the area of the tread surface of the tire, but further as a means to protect the tread for the purpose of reducing the puncturing thereof to a minimum, under such conditions increasing the life of the outer casing of the tire thereby materially decreasing tire cost.

A further object of the invention is to provide, in a manner as hereinafter set forth, an armor or protector for pneumatic tires including an annulus positioned against the tread surface of the tire and further including means whereby the annulus is resiliently connected in position so as not to interfere with the cushioning function of the tire.

Further objects of the invention are to provide an armor or protector, in a manner as hereinafter set forth, for pneumatic tires, which is simple in its construction and arrangement, strong, durable, thoroughly efficient in its use, conveniently applied and removed when occasion requires, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a pneumatic tired wheel, showing the use therewith of an armor or protector for the tire.

Figure 2 is an edge view of the armor or protector, showing the use thereof in connection with the tire of the wheel.

Figure 3 is a fragmentary view, in section, of the armor or protector.

Figure 4 is a fragmentary view, in cross section, of a wheel provided with a pneumatic tire and showing the use therewith of an armor or protector in accordance with this invention.

Figure 5 is a fragmentary view, in perspective, of an armor or protector in accordance with this invention, and further illustrating one of the coupling members extended or in open position.

Referring to the drawings in detail, 1 denotes the hub, 2 the spokes, 3 the felly, and 4 the rim of a wheel. The rim 4 is constructed for the purpose of connecting a pneumatic tire with the wheel, and the tire consists of an inner tube 5 and an outer casing 6, and with the outer casing having an extended tread portion 7. The form of rim and pneumatic tire is illustrated by way of example, as it is to be understood that an armor or protector in accordance with this invention can be employed with any suitable type of pneumatic tire connected with the felly 3 of the wheel by any suitable form of rim.

An armor or protector, in accordance with this invention, comprises a reinforced annulus of resilient material and a series of resilient coupling devices for connecting the annulus in operative position with respect to the tread of the outer casing 6, for the purpose of protecting said tread to prevent wear thereof, and furthermore to prevent the puncturing of the outer casing 6 at the tread portion thereof. The annulus, termed a tread protecting member is formed of an annular body portion 8 of substantial width and thickness and which is constructed of resilient material, preferably rubber, and which has embedded therein an annular metallic insert 9, formed of a woven wire band made from plow steel wire cable. The insert 9 is arranged between the center and inner face of the body portion 8 and not only reinforces the protecting member, but also acts as a means to arrest the passage of an object, such as nails or glass, from penetrating through the protecting member and engaging the tread of the casing 6. The inner portion of each edge of the protecting member is rounded, as at 10, and the outer portions of the side edges of the protecting member incline towards each other whereby the outer portion of the member will gradually decrease in width towards the outer face of the member.

In cross section, the inner face of the protecting member is disposed in parallelism with respect to the outer face of said member, and the width of the inner portion of the member is greater than the width of the tread surface of the casing 6, so that as the tread surface of the casing 6 is segmental in contour when the protecting member is positioned thereagainst, the marginal portions of the inner face of said member will be spaced from the tread of the casing 6 in a manner as shown in Figure 4.

The protecting member is connected in position against the tread of the casing 6, through the medium of a series of resilient coupling devices, which are secured to the inner face of the protecting member and are connected to the felly 3 of the wheel. As each of the coupling devices is of the same construction, but one will be described, as the description of one will apply to the other.

Each of said coupling devices consists of a yoke-shaped flat support 11 positioned on the felly 3, and with the arms of the support 11, as indicated at 12, 13, arranged against the side of the felly 3. Each of the arms of the support is formed with a pair of openings 14 and each of the openings is positioned at a point in close proximity to a side edge of an arm. The openings in the arm 12 align with the openings in the arm 13, and further register with openings 15 formed in the felly 3. The support 11 is fixedly secured to the felly by a pair of stay members 16, each having each of its ends upset to provide a head as at 16′, Fig. 4. The stay members 16 extend through the registering openings 14 and 15 and the heads of each pair of stay members, at the ends of said members, provide guiding means for a purpose to be presently referred to. The support 11 has a portion thereof offset, as indicated at 17, to constitute a stop for a purpose to be presently referred to.

Each of said coupling devices further includes a pair of connecting arms 18 and 19, and each of which is formed with an inset portion 20 and a straight inner terminal portion 21. The arm 18 has a right angularly disposed outer terminal portion 22 which extends transversely of the inner face of the protecting member and is connected to the latter by rivets 23, having their heads countersunk in openings 24, formed in the protecting member, and their inner ends upset and countersunk in the outer end terminal portion 22.

The outer end portion 22 is of a length slightly greater than the width of the inner face of the protecting member, and the free end of said outer terminal portion is provided with a barrel 25, which is interposed between a pair of barrels 26, formed on the outer terminus of the arm 19. The barrels 25, 26, are connected together by a pin 27, which in connection with the barrels provides a hinged connection between the arms 18 and 19, so that the arm 19 can be swung away from the arm 18, as shown in Figure 5.

The arms 18 and 19 project inwardly from the protecting member and are arranged at opposite sides of the casing 6, and the inset portions 20 of the arms position the inner end terminal portions 21 of the arms against the outer faces of the arms 12 and 13 and between the heads 16′ of the stay members 16, whereby said heads 16′ will constitute guides for the arms 18 and 19, when these latter shift relatively to the support 11.

The inner terminal portion of each of the arms 18 and 19, is formed with a pair of openings 28, for the passage of a pair of parallel bolts 29 to connect the arms 18 and 19 in parallel relation and to maintain the inner terminal portions 21 of said arms 18 and 19 against the arms of the support 11. The end terminal portions 21 of the arms 18 and 19, project inwardly from the support 11. Each of the bolts 29 extend through a sleeve 30 formed by the inturned sides of an apertured plate 30′ interposed between the end terminal portions 21. Securing nuts 31 are mounted on the bolts 29. The bolts are extended through the openings 28 in the inner terminal portion of the arm 18, after which the sleeves 30 are mounted on the bolts. The heads of the bolts 29 abut against the outer face of the inner terminal portion 21 of the arm 18, and the shanks of the bolts project through the openings 28 in the inner terminal portion 21 of the arm 19. The projecting ends of the shanks of the bolts are threaded, as at 32, and engaging therewith are the securing nuts 31.

Mounted on the support 21, is the base 33 of a post 34, which projects inwardly from the support 11 and carries on its inner end an adjusting nut 35, against which is positioned a metallic washer 36. Surrounding the post 34 and abutting against the washer 36, is a coiled spring 37. The post 34 has its base 33 positioned against the stop 17, and when the coupling device is set up, the post 34 is extended through the plate 30′ and against the latter abuts the spring 37, whereby the latter is interposed between the plate 30′ and washer 36. The spring 37 is employed to provide for the resiliency of the coupling device and further sets up a cushioning function. The plate 30′ acts as a stop to prevent the shifting of the post, and the post is furthermore locked in position on the support 11, through the medium of the offset portion 17 which straddles the post and bears against the base 33, and also by a locking element consisting of an arm 38, which is secured, as at 39 to the inner face of the end terminal portion 21 of the arm 19, and projects inwardly therefrom. The inner or free end of the arm 38 is bifurcated, as at 40, for the purpose of straddling the post 34. The arm 38 is furthermore slitted, and the material freed by the slit is offset from the arm, as at 41 to provide an abutment which engages the end terminal portion 21 of the arm 19, and is furthermore secured therewith, as at 42.

The coupling devices are removably connected with the wheel and owing to the arrangement of the spring 37 the said devices possess resiliency to compensate for the contraction and expansion of the tire when traveling over uneven road surfaces, and said springs 37 act to maintain the protecting member in position with respect to the tread of the casing 6. The nut 35 enables the increasing or decreasing of the tension of the spring 37 when desired.

An armor or protector, in accordance with this invention, will not only increase the life of the casing 6 of the tire, due to the fact that the wear will be upon the protecting member, but said member furthermore will prevent the penetration through the tread portion of the casing 6 of nails, glass or other objects, thereby increasing the life of the inner tube 5, and although the preferred embodiment of the invention is as illustrated and described, yet it is to be understood that changes in the details of construction can be had which will fall within the light of the invention as claimed.

What I claim is:—

1. In an armor or protector for pneumatic tires, a plurality of coupling devices for maintaining the protecting member of the armor in position with respect to the tread of the tire, each of said devices consisting of a pair of arms hinged together and with one of the arms adapted to be secured to said member, a post extending inwardly from the felly of the wheel, a pair of coupling members for detachably connecting said arms together at a point inwardly with respect to the felly of the wheel, said post extended between said members, a coiled spring interposed between said coupling members and the inner terminal portion of said post, means carried by one of said arms for locking said post in position, and means adapted to be secured to the felly of the wheel and constituting a support for said post and further providing guides for said arms.

2. In an armor or protector for pneumatic tires, a plurality of coupling devices for maintaining the protecting member of the armor in position with respect to the tread of the tire, each of said devices consisting of a pair of arms hinged together and with one of the arms adapted to be secured to said member, a post extending inwardly from the felly of the wheel, a pair of coupling members for detachably connecting said arms together at a point inwardly with respect to the felly of the wheel, said post extended between said members, a coiled spring interposed between said coupling members and the inner terminal portion of said post, means carried by one of said arms for locking said post in position, means adapted to be secured to the felly of the wheel and constituting a support for said post and further providing guides for said arms, and the inner terminal portions of said arms being inset to slidably engage between said guides.

3. An armor or protector for pneumatic tires comprising coupling devices for the protecting member of the armor, each of said coupling devices including a pair of hinged arms extended inwardly from said member and with one of the arms adapted to be secured to the member, coupling members for the arms, a resilient element abutting against said coupling members, retaining means for said resilient element, means carried by one of said arms for locking said retaining means, and means to provide a support for said retaining means and further to provide spaced guides for said arms.

4. An armor or protector for pneumatic tires comprising coupling devices for the protecting member of the armor, each of said coupling devices including a pair of hinged arms extended inwardly from said member and with one of the arms adapted to be secured to the member, coupling members for the arms, a resilient element abutting against said coupling members, retaining means for said resilient element, means carried by one of said arms for locking said retaining means, means to provide a support for said retaining means and further to provide spaced guides for said arms, and said arms having inset inner terminal portions slidably extended between said guides.

5. In an armor or protector for pneumatic tires, a plurality of coupling devices for the protecting member of the armor, each of said devices including a yoke-shaped support adapted to be secured to the felly of the wheel and provided with stops and having its securing means providing guides, a pair of hinged arms positioned between said guides and with one of said arms adapted to be secured to said projecting member, a pair of coupling members for detachably connecting the inner ends of said arms together, a post positioned against said stop and extending between said coupling members and provided with an abutment, a coiled spring interposed between said abutment and said coupling members, and a locking element carried by one of said arms and engaging with said post for locking it in position.

6. In an armor or protector for pneumatic tires, a coupling device comprising a pair of hinged arms extended inwardly from and having one of the arms fixedly secured to the armor, coupling members detachably connected with the inner ends of the arms for coupling them together, a resilient element abutting against said members, retaining means for said element, means carried by one of said arms and engaging with said retaining means for locking it in position, a support for said retaining means, and stay elements for said support, said stay elements providing spaced guides for said arms.

7. In an armor or protector for pneumatic tires, a coupling device comprising a pair of hinged arms extended inwardly from and having one of the arms fixedly secured to the armor, coupling members detachably connected with the inner ends of the arms for coupling them together, a resilient element abutting against said members, adjustable retaining means for said element, means carried by one of said arms and engaging with said retaining means for locking it in position, and means to provide a support for said retaining means and spaced guides for said arms.

In testimony whereof, I affix my signature hereto.

CHARLES K. BULGARIDES.